May 1, 1962     J. F. BREWER     3,032,524
METHOD OF ADJUSTING THE pH VALUE OF LATEX
Original Filed Aug. 29, 1957
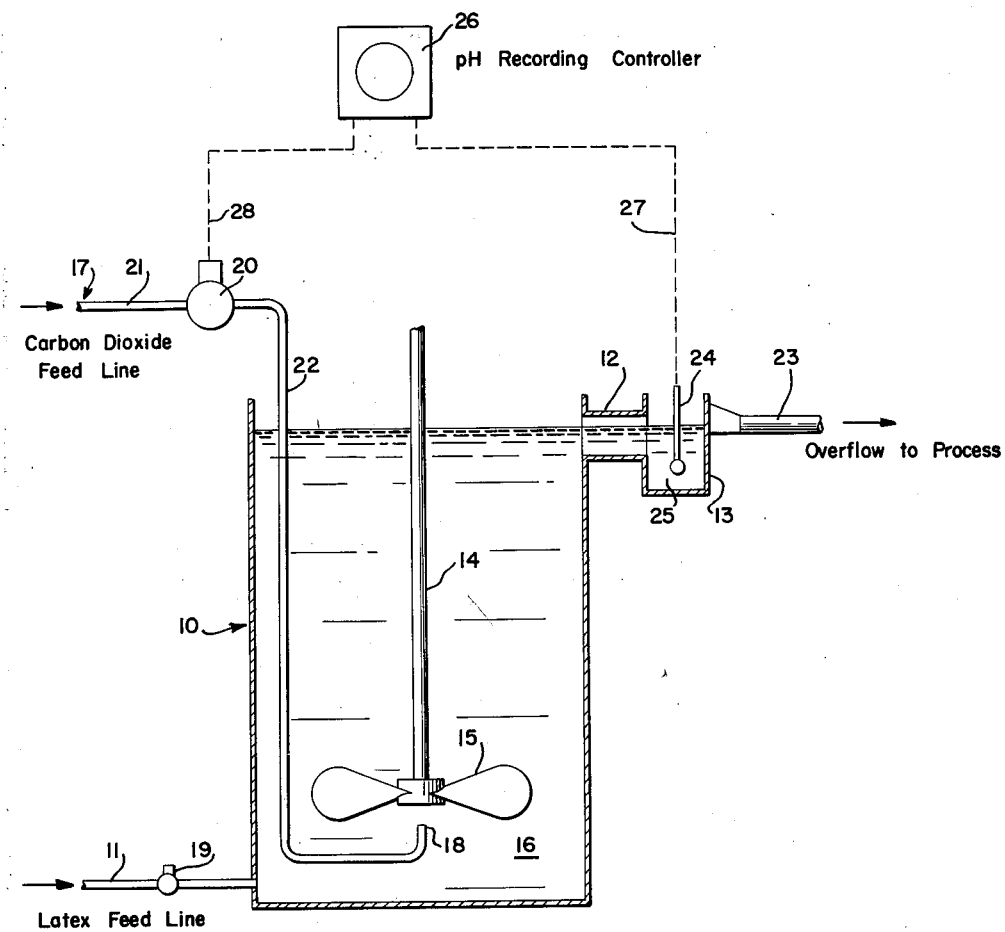
INVENTOR
JOHN F. BREWER
BY Shanley & O'Neil
ATTORNEYS

United States Patent Office 3,032,524
Patented May 1, 1962

3,032,524
METHOD OF ADJUSTING THE pH VALUE OF LATEX
John F. Brewer, Baton Rouge, La., assignor to Copolymer Rubber & Chemical Corporation, a corporation of Louisiana
Continuation of application Ser. No. 680,974, Aug. 29, 1957. This application July 10, 1959, Ser. No. 830,447
14 Claims. (Cl. 260—29.7)

This invention relates to the destabilization of synthetic rubber latex and more particularly to an improved process for destabilizing synthetic rubber latex by adjustment of pH.

This application is a continuation of my pending application Serial No. 680,974, filed August 29, 1957, now abandoned.

In many industrial processes using synthetic rubber latex, such as in the manufacture of foam rubber, it is desirable that the latex have certain properties, among the more important being a high solids content such as about 60% TSC or higher, and a low viscosity such as less than about 1000 centipoises at 60% TSC. In general, within reasonable limits, the higher the solids content and the lower the viscosity, the more desirable the latex.

Many attempts have been made to prepare satisfactory low viscosity high solids synthetic rubber latices. One of the more common processes has involved emulsion polymerization in an aqueous medium of suitable monomers, with or without suitable comonomers, using a recipe for high solids content. The quantity of water used in such a recipe is kept at a minimum, as are the number of soap micelles serving as centers of polymerization. Thus, a relatively small number of particles of polymer are activated and the end result is an increase in the average particle size of the resulting synthetic rubber latex. This procedure is not satisfactory for a number of reasons, among the more important being the extremely long reaction time required and the difficulty of controlling the temperature, reaction rate and viscosity during polymerization. In addition, the viscosity of the end latex product is relatively high in many instances and a uniform low viscosity high solids latex product is difficult to produce on a commercial scale.

Starting soon after World War II, processes were developed for the agglomeration of low solids small average particle size latex. While low solids small average particle size latex may not be concentrated to over about 35–45% TSC without encountering extremely high viscosities and prohibitive amounts of pre-coagulum, the same latex after sufficient agglomeration may be concentrated to higher solids content, such as 60% TSC and with a reasonable viscosity. Since a low solids small average particle size synthetic rubber latex may be prepared using a conventional fast reaction recipe at low solids content is only a fraction of the reaction time required for polymerization when using a recipe at high solids content and without the attendant production problems, such processes have been of considerable interest to the art.

One of the more satisfactory low temperature processes for the agglomeration of low solids small particle size synthetic rubber latex is one in which a low solids GR–S latex is agglomerated by first reducing the pH with carbon dioxide and then freezing for a short period of time at a temperature moderately below the freezing point of the latex. The agglomerated GR–S latex thus produced may be concentrated to produce a high solids latex of reasonable viscosity.

The pH reduction step in the above mentioned agglomeration process is critical and the pH must be maintained within a narrow pH range for the most effective agglomeration of the latex upon freezing. If the pH is reduced too much, then excessive pre-coagulum will be formed in both the pH adjustment step and the subsequent agglomeration step; if the pH is adjusted to a value which is too high, then the latex is not destabilized sufficiently for efficient agglomeration upon freezing. Usually the pH of the original latex is about 10 and for most effective agglomeration the pH should be adjusted to about 7.8 to 8.5. At such pH levels, the latex is destabilized to such an extent that there is an objectionable tendency to the formation of pre-coagulum.

It has been proposed to reduce the pH of the synthetic rubber latex by agitation under a carbon dioxide atmosphere. However, this method of carbon dioxide addition is too time consuming to be of practical value in a commercial application requiring rapid reduction of pH, control of pH within narrow limits such as 8.1 to 8.2, and reduction of pH with a minimum of coagulum formation. When an attempt was made to adjust the pH at a rapid rate by injecting carbon dioxide directly into the latex, it was found that the stability characteristics of the latex were such as to result in excessive pre-coagulum formation, often as much as 30%. In addition, it was not possible to control the pH within the necessary narrow range most suitable for effective agglomeration.

It has been discovered that a synthetic rubber latex may be rapidly destabilized by adjustment of pH with a gaseous acidic substance and with only a minimum amount of pre-coagulum formation. In accordance with the present invention, the gaseous acidic substance is injected directly into the latex at a linear velocity at the point of injection which is sufficiently low to prevent the formation of an objectionable amount of pre-coagulum. The process of the invention is very rapid as compared with the prior art processes and in addition, the pH may be controlled within a desired narrow range.

It is an object of the present invention to provide an improved process for the destabilization of synthetic rubber latex.

It is a further object of the present invention to provide an improved process for rapidly adjusting the pH of synthetic rubber latex by means of a gaseous acidic substance wherein the pH may be controlled within a narrow pH range.

It is still a further object of the present invention to provide an improved process for adjusting the pH of synthetic rubber latex by injecting a gaseous acidic substance directly into the latex in such a manner as to prevent the formation of an objectionable amount of pre-coagulum.

It is still a further object of the present invention to provide an improved process for adjusting the pH of an alkaline synthetic rubber latex by injecting carbon dioxide directly into the latex and in such a manner as to minimize pre-coagulum formation.

Still other objects of the present invention and the attendant advantages thereof will be apparent to those skilled in the art by reference to the following detailed description and the drawing, which diagrammatically illustrates one suitable arrangement of apparatus for destabilizing synthetic rubber latex in accordance with the present invention.

Referring now to the drawing, the agitation vessel 10, which may be open to the atmosphere at its upper end, is provided with a conduit 11 for feeding synthetic rubber latex into a lower portion thereof, an overflow conduit 12 in an upper portion thereof for transfer of destabilized latex to container 13, an agitator 14 provided with an impeller 15 on its lower end and suitably positioned to agitate the latex contents 16, and a conduit 17 for feeding a gaseous acidic substance suitable for destabilizing the latex contents 16. Preferably, the nozzle end 18 of conduit 17 is so arranged as to be directly below the eye of impeller 15. The flow rates of synthetic rubber latex in conduit 11 and gaseous acidic substance in conduit 17 are controlled by means comprising valves 19 and 20, respectively. When desired, the conduit 17 may comprise a portion 21 of relatively small diameter and a portion 22 of relatively large diameter.

The container 13 is provided with an overflow conduit 23 leading, for example, to storage or to the process in which the destabilized latex is to be used as a feed, and a pH electrode 24 for measuring the pH of the destabilized latex contents 25. A pH recording controller 26 is operably connected in a conventional manner to pH electrode 24 and control valve 20 by connections 27 and 28, respectively. The pH recording controller 26 continuously records the pH of the destabilized latex 25 overflowing via conduit 12 from agitation vessel 10, as measured by means comprising pH electrode 24, and operates valve 20 in conduit 11 in response to changes in the pH to thereby control the feed rate of gaseous acidic substance to latex 16 and in this manner maintain the pH of the destablized latex at a desired predetermined value.

The acidic gaseous substance for use in effecting pH reduction of synthetic rubber latex in accordance with the present invention may be any suitable acidic gaseous substance which does not adversely affect the latex. Preferably, such gaseous acidic substances should be insoluble in water or exhibit only a limited solubility in water such as carbon dioxide, sulfur dioxide, etc. In general, carbon dioxide is preferred over other gaseous acidic substances.

In accordance with the present invention, it is essential that the gaseous acidic substance be injected into the latex at a sufficiently low linear velocity at the point of injection to prevent the formation of a prohibitive amount of pre-coagulum. When carbon dioxide is the gaseous acidic substance, a linear velocity at the point of injection in excess of about 500 feet per second will usually result in the formation of a large amount of pre-coagulum. In general, due to the different stability characteristics of the various synthetic rubber latices, it is not possible to set a definite upper limit on the linear velocity. However, when carbon dioxide is the gaseous acidic substance, linear velocities of 25 feet per second and below generally are suitable in all instances, with the lower limit being of a practical nature, i.e., a linear velocity sufficient to result in the transfer of a desired quantity of carbon dioxide in a practical period of time. Linear velocities of about 3 to 10 feet per second at the point of injection will result in the formation of even less pre-coagulum than higher velocities and usually provide for the transfer of a sufficient volume of carbon dioxide for rapid adjustment of pH in accordance with the present invention, while a linear velocity at the point of injection of about 5 feet per second is generally preferred. By increasing the area of the conduit nozzle or the number of nozzles, it is apparent lower velocities may be used to transfer a given amount of carbon dioxide required to effect adjustment of pH to the desired level at the flow rate of latex in the continuous process.

Better results may be obtained by mildly agitating the latex at the point of injection of the gaseous acidic substance. However, preferably the agitation should not be more vigorous than necessary for intimate contact between the gaseous acidic substance and the latex for the purpose of assuring substantially complete absorption and uniform distribution of the gaseous acidic substance. In no instance should the agitation be sufficiently violent as to result in the formation of an excessive amount of pre-coagulum in the latex due to the mechanical shearing action of the agitator. For example, satisfactory mild agitation at the point of injection of the gaseous acidic substance may be achieved when the agitation vessel is a 55-gallon open top drum by means of an agitator provided with an impeller 6 to 12 inches in diameter operated at a speed of about 100–400 revolutions per minute. Usually, lower agitation speeds are preferred over higher agitation speeds provided sufficient agitation is obtained to prevent excessive loss of carbon dioxide to the atmosphere. When the agitator is provided with a larger impeller to effect sufficient agitation in a larger agitation vessel, then it may be desirable to use agitation speeds slower than 100–400 revolutions per minute due to the increase in the peripheral speed of the impeller blades.

The destabilized synthetic rubber latex prepared in accordance with the present invention is particularly useful in the agglomeration of low solids relatively small average particle size synthetic rubber latex by a prior art freezing process. When using the process of the present invention, the pH of the latex may be rapidly reduced from its original value (usually about 10) to the most effective pH for agglomeration by a freezing process with only a very small amount of pre-coagulum formation. Usually, this is within a pH range of about 7.8 to 8.5 for most latices, but varies depending somewhat upon the characteristics of the specific latex to be processed. For many butadiene-styrene latices, a pH of 8.1 to 8.2 is preferred.

The synthetic rubber latices to be processed in accordance with the invention may be prepared by processes well known in the art such as, for example, processes wherein polymerizable monomeric compounds are emulsified in an aqueous medium by means of an emulsifying agent such as a soap or other suitable surface active agent, and the polymerization made to take place at a suitable controlled temperature in the presence of a suitable catalyst and/or other regulating materials. The primary emulsifier preferably should be a long chain fatty acid soap for best results such as sodium or potassium oleate rather than the rosin soaps. The polymerization is generally "short-stopped" at a suitable stage before complete conversion, such as at about 60% conversion, and the unreacted monomer or monomers removed by conventional flashing and/or stripping. As is well understood in the art, it is also advantageous in the preparation of certain synthetic rubber latices, such as SBR latices, to carry out the polymerization at a low temperature such as about 41° F.

Examples of polymerizable materials for use in preparing synthetic rubber latices are the various 1, 3-butadienes such as 1, 3-butadiene, methyl-2-butadiene-1, 3, piperylene, and 2, 3-dimethyl-butadiene-1,3. If desired, the polymerizable material may be a mixture of a 1, 3-butadiene, such as 1, 3-butadiene, with another polymerizable compound which is capable of forming rubbery copolymers with 1, 3-butadienes. For example, such polymerizable mixtures may contain up to 50% (or higher in some instances) of a compound which contains a $CH_2=C=$ group wherein at least one of the disconnected valences is attached to an electro-active group, i.e., a group which substantially increases the electrical dissymmetry or polar character of the molecule. Examples of compounds containing the aforementioned group and copolymerizable with the 1, 3-butadienes are the aryl olefins, such as styrene and vinyl naphthalene; the alpha methylene carboxylic acids, and their esters, nitriles and amides, such as acrylic acid, methyl acrylate, methyl methacrylate, acrylonitrile, methacrylonitrile and methacrylamide; isobutylene; methyl vinyl ether; and methyl vinyl ketone. Compounds containing the aforementioned group and copolymerizable with the 1,3-butadienes may be referred to herein as monoethylenically unsaturated monomers. The preferred polymerizable material when the pH adjusted synthetic rubber latex is to be agglomerated by a freezing process is a mixture of butadiene and styrene wherein the styrene content of the mixture, by weight, is less than about 50%. A typical recipe in parts by weight for preparing a styrene-butadiene copolymer latex for use in the present invention is given below in Table 1.

TABLE I

| | |
|---|---|
| Butadiene | 100–50 |
| Styrene | 0–50 |
| Potassium or Sodium Oleate | 1.5–5.0 |
| Electrolyte [1] | 0.2–1.5 |
| Secondary Emulsifier [2] | 0–1.5 |
| Ethylenediamine Tetraacetic Acid Tetra Sodium Salt [3] | [4] 0–0.10 |
| Sodium Hydrosulfite | 0–0.10 |
| Water | 150–250 |
| Sodium Formaldehyde Sulfoxylate | 0.04–0.20 |
| Diisopropylbenzene Hydroperoxide or Paramenthane Hydroperoxide | 0.05–0.30 |
| Tertiarydodecylmercaptan | 0–0.3 |
| Ferrous Sulfate Heptahydrate | 0.02–0.04 |
| Versene 100 to complex ferrous sulfate | 0.03–0.06 |
| Shortstop | 0.05–0.20 |

[1] The following electrolytes or mixtures of any two may be used: Potassium chloride, sodium chloride, trisodium phosphate, tripotassium phosphate, potassium pyrophosphate, potassium sulfate, sodium sulfate, sodium borate and lithium chloride.
[2] Tamol N, Daxad 11, Nycol (polymerized sodium salts of alkyl naphthalene sulfonic acid).
[3] Sold as Versene 100, a product of Dow Chemical Company; Sequestrene 30A, a product of Alrose Chemical Company; Nullapon BF–13, a product of Antara Chemicals.
[4] (In soap solution.)

The following example further illustrates the present invention.

Example

This example illustrates the destabilization of low solids small average particle size synthetic rubber latex in accordance with the present invention. The destabilized latex thus prepared may be readily agglomerated to a relatively large average particle size by freezing in accordance with prior art practice, and then the agglomerated latex thus prepared may be concentrated by a conventional process to produce commercial high solids latex.

A SBR latex (79 parts butadiene-21 parts styrene) was prepared by a conventional "cold rubber" process using the recipe of Table I. The polymerization was short-stopped at 60% conversion and the unreacted monomers removed by conventional flashing and stripping. The resulting small average particle size latex had a solids content of 18.1% and a pH of about 10.

The above prepared latex was cooled to about 40° F. and fed to the agitation vessel 10 (a 55-gallon open-top drum) via conduit 11 at a feed rate of 10 gallons per minute controlled by valve 19. The latex 16 contained in agitation vessel 10 was agitated continuously by means of agitator 14. The agitator 14 was provided with a 12-inch impeller 15 and operated at 100 revolutions per minute.

Gaseous carbon dioxide at 25 p.s.i.g. was fed from a storage cylinder to portion 21 (¼ inch diameter) of conduit 17, expanded at a rate controlled by valve 20 into portion 22 (1 inch diameter) of conduit 17, and then injected into the latex 16 at nozzle end 18 at a linear velocity of about 5 feet per second. The nozzle end 18 was arranged slightly below the impeller 15 and so as to inject the carbon dioxide upward into the eye of impeller 15.

The destabilized latex was allowed to overflow via conduit 12 into container 13. The pH of the destabilized latex 25 in container 13 was measured by means comprising pH electrode 24, and the carbon dioxide feed rate to agitation vessel 10 was controlled by means comprising valve 20 at a feed rate such as to reduce the pH of the latex from about 10 to 8.2. Valve 20 was operated by pH recording controller 26 in response to changes in the pH of the destabilized latex 25 as hereinbefore described and so as to maintain the pH at a value of 8.2.

The destabilized latex 25 was passed from container 13 via conduit 23 and agglomerated to a relatively large average particle size by freezing. The resulting agglomerated latex was concentrated by conventional means to a high solids content such as 60% TSC.

Only very small amounts of pre-coagulum was formed during destabilization of the latex by the above process. In addition, it was possible to achieve excellent control of pH and carbon dioxide usage was held to a minimum.

I claim:

1. In a method of adjusting the pH value of alkaline latex to a lower pH value including the step of passing a gaseous acidic substance into the latex, the improvement comprising forming a continuously flowing stream of at least one alkaline latex selected from the class consisting of latices of homopolymers of conjugated diolefins and latices of copolymers of conjugated diolefins and monoethylenically unsaturated monomers, injecting a continuous stream of gaseous acidic substance selected from the class consisting of carbon dioxide, sulfur dioxide and mixtures thereof into the stream of alkaline latex in an amount to adjust the pH value thereof to the lower pH value, the gaseous acidic substance being injected into the latex at a linear velocity less than about 500 feet per second at the point of injection, and adjusting the pH value of the entire stream of alkaline latex to the lower pH value by uniformly intermixing the continuously injected gaseous acidic substance with the continuously flowing stream of alkaline latex by agitating the alkaline latex and the injected gaseous acidic substance immediately adjacent the point of injection and dispersing the intermixture through the entire stream of alkaline latex whereby formation of prefloc is reduced.

2. The method of claim 1 wherein the gaseous acidic substance is carbon dioxide.

3. The method of claim 1 wherein the gaseous acidic substance is injected into the latex at a linear velocity of about 3–25 feet per second at the point of injection.

4. The method of claim 3 wherein the gaseous acidic substance is carbon dioxide.

5. In a method of adjusting the pH value of alkaline latex to a lower pH value including the step of passing a gaseous acidic substance into the latex, the improvement comprising forming a continuously flowing stream of alkaline styrene-butadiene copolymer latex, injecting a continuous stream of gaseous acidic substance selected from the class consisting of carbon dioxide, sulfur dioxide and mixtures thereof into the stream of alkaline latex in an amount to adjust the pH value thereof to the lower pH value, the gaseous acidic substance being injected into the latex at a linear velocity less than about 500 feet per second at the point of injection, and adjusting the pH value of the entire stream of alkaline latex to the lower pH value of uniformly intermixing the continuously injected gaseous acidic substance with the continuously flowing stream of alkaline latex by agitating the alkaline latex and the injected gaseous acidic substance immediately adjacent the point of injection and dispersing the intermixture through the entire stream of alkaline latex whereby formation of prefloc is reduced.

6. The method of claim 5 wherein the gaseous acidic substance is carbon dioxide.

7. The method of claim 5 wherein the gaseous acidic substance is injected into the latex at a linear velocity of about 3–25 feet per second at the point of injection.

8. The method of claim 7 wherein the gaseous acidic substance is carbon dioxide.

9. In a method of adjusting the pH value of alkaline synthetic rubber latex to a lower pH value including the step of passing a gaseous acidic substance into the latex, the improvement comprising continuously passing a stream of styrene-butadiene copolymer latex through a vessel, the alkaline styrene-butadiene copolymer latex being passed into a lower portion of the vessel at a feed point and the latex after adjustment of the pH to the lower value being withdrawn from an upper portion of the vessel at a withdrawal point spaced from the feed point, injecting a continuous stream of gaseous acidic substance selected from the class consisting of carbon dioxide, sulphur dioxide and mixtures thereof into the stream of latex at a point between the feed point and the withdrawal point in an amount to adjust the pH value thereof to the lower pH value, the gaseous acidic substance being injected into the latex at a linear velocity less than about 500 feet per second at the point of injection, and adjusting the pH value of the entire stream of latex to the lower pH value by uniformly intermixing the continuously injected gaseous acidic substance with the continuously flowing stream of latex by agitating the latex and the injected gaseous acidic substance immediately adjacent the point of injection and dispersing the inter-mixture through the entire stream of latex whereby formation of prefloc is reduced.

10. The method of claim 9 wherein the gaseous acidic substance is injected into the latex at a linear velocity of about 3–25 feet per second at the point of injection.

11. In a method of adjusting the pH value of alkaline synthetic rubber latex to a lower pH value including the step of passing carbon dioxide into the latex, the improvement comprising continuously passing a stream of alkaline styrene-butadiene copolymer latex through a vessel, the alkaline styrene-butadiene copolymer latex having a pH of about 10 and being passed into a lower portion of the vessel at a feed point and the latex after adjustment of pH to a value of about 7.8–8.5 being withdrawn from an upper portion of the vessel at a withdrawal point spaced from the feed point, injecting a continuous stream of carbon dioxide into the continuously flowing stream of latex at a point between the feed point and the withdrawal point in an amount to adjust the pH value thereof to about 7.8–8.5, the gaseous acidic substance being injected into the latex at a linear velocity less than about 500 feet per second at the point of injection, and adjusting the pH value of the entire stream of latex to about 7.8–8.5 by uniformly intermixing the continuously injected gaseous acidic substance with the continuously flowing stream of latex by agitating the latex and the injected gaseous acidic substance immediately adjacent the point of injection and dispersing the intermixture through the entire stream of latex whereby formation of prefloc is reduced.

12. The method of claim 11 wherein the gaseous acidic substance is injected into the latex at a linear velocity of about 3–25 feet per second at the point of injection.

13. In a method of adjusting the pH value of alkaline synthetic rubber latex to a lower pH value including the step of passing carbon dioxide into the latex, the improvement comprising continuously passing a stream of alkaline styrene-butadiene copolymer latex through a vessel, the alkaline styrene-butadiene copolymer latex having a pH of about 10 and a temperature of about 40° F. and being passed into a lower portion of the vessel at a feed point and the latex after adjustment of pH to a value of about 7.8–8.5 being withdrawn from an upper portion of the vessel at a withdrawal point spaced from the feed point, the vessel having a capacity for latex about 5.5 times the feed rate per minute of latex, injecting a continuous stream of carbon dioxide into the continuously flowing stream of latex at a point between the feed point and the withdrawal point in an amount to adjust the pH value thereof to about 7.8–8.5, the gaseous acidic substance being injected into the latex at a linear velocity less than about 500 feet per second at the point of injection, and adjusting the pH value of the entire stream of latex to about 7.8–8.5 by uniformly intermixing the continuously injected gaseous acidic substance with the continuously flowing stream of latex by agitating the latex and the injected gaseous acidic substance immediately adjacent the point of injection and dispersing the intermixture through the entire stream of latex whereby formation of prefloc is reduced, the latex being agitated by means of an impeller rotating around an upright axis at a peripheral speed of about 157–1257 feet per minute and the carbon dioxide being injected immediately below the impeller and into the eye of the impeller.

14. The method of claim 13 wherein the gaseous acidic substance is injected into the latex at a linear velocity of about 3–25 feet per second at the point of injection.

References Cited in the file of this patent

UNITED STATES PATENTS

| | | |
|---|---|---|
| 2,494,002 | Rumbold | Jan. 10, 1950 |
| 2,538,273 | Rhines | Jan. 16, 1951 |
| 2,770,603 | Lynch | Nov. 13, 1956 |

FOREIGN PATENTS

| | | |
|---|---|---|
| 758,622 | Great Britain | Oct. 3, 1956 |